United States Patent
Risch

(10) Patent No.: US 9,409,641 B2
(45) Date of Patent: Aug. 9, 2016

(54) DEVICE FOR LIMITING THE DEFLECTION ON A DOOR ARRANGED IN A FUSELAGE CELL OF AN AIRCRAFT

(71) Applicant: Airbus Operations GmbH, Hamburg (DE)

(72) Inventor: Ronald Risch, Stuhr (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/289,690

(22) Filed: May 29, 2014

(65) Prior Publication Data
US 2014/0346277 A1     Nov. 27, 2014

Related U.S. Application Data

(63) Continuation of application No. 12/289,433, filed on Oct. 28, 2008, now Pat. No. 8,740,148.

(60) Provisional application No. 61/013,318, filed on Dec. 13, 2007.

(51) Int. Cl.
*B64C 1/14*     (2006.01)

(52) U.S. Cl.
CPC ................ *B64C 1/1461* (2013.01); *B64C 1/14* (2013.01)

(58) Field of Classification Search
CPC .... B64C 1/1407; B64C 1/1423; B64C 1/143; B64C 1/1438; B64C 1/1461; B64C 2001/009
See application file for complete search history.

(56) References Cited

U.S. PATENT DOCUMENTS

| | | | |
|---|---|---|---|
| 2,351,859 A | 6/1944 | Kaiser | |
| 2,375,924 A | 5/1945 | Seth | |

(Continued)

FOREIGN PATENT DOCUMENTS

| | | |
|---|---|---|
| DE | 44 01 899 | 7/1995 |
| DE | 100 35 334 | 2/2002 |

(Continued)

OTHER PUBLICATIONS

Non-Final Office Action for U.S. Appl. No. 12/289,433 dated Sep. 7, 2011.

(Continued)

*Primary Examiner* — Elizabeth A Quast
(74) *Attorney, Agent, or Firm* — Jenkins, Wilson, Taylor & Hunt, P.A.

(57) ABSTRACT

The invention relates to a device for limiting the deflection of a door (1), particularly a hatch or a freight door, arranged in a fuselage cell (3) of an aircraft, having at least one holding element (5) arranged preferably in the region of a door jamb (4) or in the region of a door leaf edge (7).
In order to ensure deflection limitation for doors, hatches and freight doors in aircraft which can be triggered manually independently of an actuation of the normal locking system, it is proposed according to the invention that the at least one holding element (5) can, if there is a sufficient pressure difference $\Delta p$ between the internal pressure $p_i$ prevailing in the fuselage cell (3) and the outside air pressure $p_a$ prevailing outside of the fuselage cell (3), be brought into engagement with at least one abutment (6) arranged in the region of the door leaf edge (7) or the door jamb (4).
In addition it is proposed that if there is a sufficiently large pressure difference $\Delta p$ the at least one holding element (30, 55) is automatically pivoted or can be manually pivoted and can hereby be brought into engagement with the at least one abutment (31, 52).

7 Claims, 6 Drawing Sheets

(56) References Cited

U.S. PATENT DOCUMENTS

| | | | |
|---|---|---|---|
| 2,526,791 A | 10/1950 | Polikarp | |
| 2,549,110 A | 4/1951 | Michael | |
| 2,577,697 A | 12/1951 | Castle | |
| 3,606,700 A | 9/1971 | Davis | |
| 4,042,193 A | 8/1977 | Cerne | |
| 4,552,326 A | 11/1985 | Bokalot | |
| 4,646,993 A * | 3/1987 | Baetke | B64C 1/18 244/117 R |
| 4,854,010 A | 8/1989 | Maraghe et al. | |
| 5,181,677 A | 1/1993 | Kaplan et al. | |
| 5,577,781 A | 11/1996 | Kallies et al. | |
| 5,673,874 A | 10/1997 | Howard | |
| 5,868,355 A | 2/1999 | Carter, Jr. | |
| 6,457,675 B1 | 10/2002 | Plude et al. | |
| 6,874,339 B2 | 4/2005 | Segawa | |
| 7,568,659 B2 * | 8/2009 | Roques | B64C 1/1407 244/121 |
| 8,250,965 B2 | 8/2012 | Ponsart | |
| 8,740,148 B2 | 6/2014 | Risch | |
| 2003/0052227 A1 | 3/2003 | Pittman | |
| 2003/0089827 A1 * | 5/2003 | Baderspach | B64C 1/1407 244/137.2 |
| 2007/0151163 A1 | 7/2007 | Thielmann et al. | |
| 2008/0006069 A1 | 1/2008 | Liao | |
| 2008/0111025 A1 | 5/2008 | Saku et al. | |
| 2009/0014590 A1 | 1/2009 | Ponsart et al. | |

FOREIGN PATENT DOCUMENTS

| | | |
|---|---|---|
| FR | 2569756 | 3/1986 |
| GB | 2 366 779 | 3/2002 |
| WO | WO 8401404 | 4/1984 |

OTHER PUBLICATIONS

Final Office Action for U.S. Appl. No. 12/289,433 dated Feb. 29, 2012.

Non-Final Office Action for U.S. Appl. No. 12/289,433 dated Mar. 26, 2013.

German Office Action for Application No. 10 2007 060 514.7 dated Jul. 23, 2014.

* cited by examiner

DEVICE FOR LIMITING THE DEFLECTION ON A DOOR ARRANGED IN A FUSELAGE CELL OF AN AIRCRAFT

CROSS-REFERENCE TO RELATED APPLICATIONS

This application is a continuation of U.S. patent application Ser. No. 12/289,433 filed on 28 Oct. 2008, and claims the benefit of U.S. Provisional Application No. 61/013,318 filed on 13 Dec. 2007, both of which are incorporated herein by reference in their entirety.

TECHNICAL FIELD

The invention relates to a device for limiting the deflection of a door arranged in a fuselage cell of an aircraft, particularly a hatch or a freight door, having at least one holding element arranged preferably in the region of a door jamb or a door leaf edge.

Moreover the invention relates to a device for limiting the deflection of a door arranged in a fuselage cell of an aircraft, particularly a hatch or a freight door, having at least one holding element and at least one abutment.

BACKGROUND

In order to reduce fuel consumption modern aircraft generally fly at high altitudes of up to 15,000 m. At this altitude there is only a low air pressure of less than 120 hPa. In order to avoid impairing the comfort of the passengers during the flight, the internal pressure in the fuselage cell of the aircraft should not be lower than the ambient air pressure of around 795 hPA prevailing under normal conditions at an altitude of around 2000 m. In order to keep the internal cabin pressure in all flying conditions between the normal ambient air pressure of around 1013 hPA at sea level and the pressure of around 795 hPA prevailing at 2000 m, the fuselage cell of nearly all modern aircraft is designed to be pressure-tight.

On account of the resulting pressure difference between the ambient pressure and the internal cabin pressure the fuselage cell must absorb considerable circumferential loads. For this reason solidly designed locking systems for doors, hatches or freight doors in the fuselage cell are necessary so that the circumferential loads can be carried away via these components.

Furthermore, particularly with large hatches, doors or freight doors, beyond the secure locking, additional precautions must be taken to limit a deflection of said hatches or doors as a result of the pressure difference (so-called "deflection limiters"). An outwardly orientated deflection of hatches, doors and freight doors is undesirable amongst other things because it results in an offset in relation to the shell of the fuselage cell, whereby the aerodynamic resistance in the region of the crack of the door increases and fuel consumption rises. In addition a large deflection has a negative effect upon the sealing system.

Known embodiments of deflection limiters are generally coupled with the opening and locking system of the door, loading hatch or freight door. The deflection limiters are formed with a plurality of pins which are received so as to be displaceable in the region of the greatest deformations in the door leaf edge. Through actuation of the door locking the pins are simultaneously moved outwards and moved into or brought into engagement at least partially with recesses arranged in the region of the door jamb. Through the locking effect of the pins the deflection due to the pressure difference between the internal cabin pressure and the ambient air pressure is prevented.

The known deflection limiters require a complex and accordingly heavy mechanical lever arrangement in order to transform the movement sequences within the door locking system into a corresponding movement back and forth of the pins in the region of the deflection limiter, that is to say moving the pins into the abutment of the deflection limiter.

SUMMARY

It is an object of the invention to create a deflection limiter for doors, hatches and freight doors in aircraft which can be manually triggered independently of an actuation of the normal locking system and which preferably works automatically, facilitating an effective force transfer between the door leaf edge and the door jamb, and which in addition has a simple structure and can thus be built in a weight-saving and reliable way.

This object is achieved by a device with the features of claim 1.

Due to the fact that in case of a sufficient pressure difference $\Delta p$ between the internal pressure $p_i$ in the fuselage cell and the outside air pressure $p_a$ prevailing outside of the fuselage cell the at least one holding element can be brought into engagement with at least one abutment arranged in the region of the door leaf edge or in the region of the door jamb, there is initially a completely automatic, exclusively pressure-controlled operation of the deflection limiter according to the invention for doors, hatches or freight doors in aircraft which works independently of whether or not the door is locked. If the aircraft reaches a certain minimum altitude the pressure difference $\Delta p = p_i - p_a$ then prevailing of around 200 hPa, corresponding to an altitude of around 2000 m, between the internal cabin pressure $p_i$ and the prevailing outside air pressure $p_a$ is sufficient to automatically bring the at least one holding element arranged in the region of the door jamb into engagement with at least one abutment arranged in the region of the door leaf edge ($p_i > p_a$, "standby state"), that is to say to preferably produce an at least partial positive locking fit. In this state, only a slight deformation of the door outwards in radial direction is still possible on account of the mechanical clearance existing between the holding element and the abutment. If the flying altitude increases further, however, the so-called "locked state" of the device is reached, in which a further deflection of the door is definitively blocked through the holding elements lying fixedly in the abutments ($p_i \gg p_a$). The device is in the "rest state" close to ground level and the door can be unlocked and operated in the normal way ($p_i \approx p_a$).

The abutment can also be arranged in the region of the door jamb while the holding element is positioned in the region of the door leaf edge.

According to an advantageous embodiment the at least one holding element is a piston with a piston rod guided resiliently in a cylinder and the at least one abutment is formed as at least one recess, wherein the piston rod can, as a result of the pressure difference $\Delta p$, be brought against the effect of a spring into at least one recess in the region of the door leaf edge for the purpose of deflection limitation thereof.

Through the effect of the spring the cylinder with the piston fixed thereto is pushed into the recess preferably arranged in the region of a door leaf edge as an abutment and hence the deflection limitation actuated ($p_i > p_a$) only if a minimum pressure difference top of around 50 to 300 hPa is exceeded. A cross-sectional geometry of the recess is such that the insertion of the piston rod into the recess is realised before the door has deflected outwardly ($p_i >> p_a$) so far that the movement of the piston rod would be blocked. The piston rod is preferably cylindrically formed while the recess is formed as a corresponding bore with limited clearance.

Under the pressure condition $p_i > p_a$ therefore the clearance between the piston rod and the recess is so great that a slight deformation of the door is still possible. Under the pressure condition $p_i >> p_a$ the piston rod lies directly against the recess and no further deflection is possible. In this state the outer shell of the fuselage cell forms with the outer door leaf excluding the crack of the door—an essentially strake-flush surface. In the rest state ($p_i \approx p_a$) close to the ground the piston is pulled back into the cylinder as a result of spring force and the door can be unlocked and operated in the usual way.

According to a further advantageous development of the device it is provided that the spring is pre-stressed.

As a result of the spring being pre-stressed the response characteristic of the deflection limitation can be adjusted so that it responds therefore only with effect from a defined minimum flying altitude. The spring can be formed for example as a helical spring which concentrically surrounds the piston rod. An adjustment device is preferably provided, by means of which the mechanical pre-stressing of the spring can be varied. The greater the pre-stressing selected, the higher the pressure difference top necessary to trigger the deflection limitation.

According to a further embodiment at least one pressure compensation channel is provided in the cylinder.

As a result of the pressure compensation channel the fuselage cell inner pressure $p_i$ prevails on one side of the piston (working side) while on the side of the piston facing away from this, in the region of the cylinder inner area, there is merely the outside air pressure $P_a$, so that no counter pressure is formed when the piston moves.

The object according to the invention is further achieved with a device according to claim 5.

Due to the fact that the at least one holding element pivots automatically or can be manually pivoted in case of a sufficiently large pressure difference $\Delta p$ and can hereby be brought into engagement with the at least one abutment, in addition to the deflection limiter being triggered merely through a pressure difference a manual actuation is also possible in a sub-variant. The deflection limiter can be actuated by an electric motor, electromagnetically, electro-hydraulically, electro-pneumatically, or purely mechanically, possibly using a remote control.

An advantageous development provides that the at least one holding element is a lever coupled to an elastic membrane with a hook, wherein the membrane is subjected on one side to the pressure difference $\Delta p$ between an internal pressure $p_i$ existing within the fuselage cell and an outside pressure $p_a$ prevailing outside of the fuselage cell, wherein the lever is automatically pivoted so far if there is a sufficiently high pressure difference $\Delta p$ until the hook formed at the end of the lever comes into engagement with at least one abutment.

In comparison with the first embodiment, this results in a structurally simplified construction which renders superfluous a cylinder which is complex to manufacture and also a piston received so as to be displaced therein. In addition, the spring can be omitted, as its functions (pulling back the piston and adjustment of the response characteristic of the deflection limiter) are simultaneously assumed by the elastic membrane which is preferably formed with an elastomer, for example with an ageing-resistant rubber or silicone.

In addition, this embodiment has the advantage that essentially only tensile forces are transmitted by the lever while the holding element in the form of the piston rod that can be displaced through a piston according to the first embodiment is essentially subjected to bending stress.

Alternatively the membrane can also be formed with a thin metal plate which moves back and forth horizontally between two positions ("rest state" and "locked state") in dependence upon the pressure difference $\Delta p$.

As an alternative to the design of the deflection limiter which is controlled by pressure difference it is provided according to a further advantageous development that the lever is designed for manual actuation by the crew.

The actuation of the lever is realised through a mechanism preferably arranged in the region of the inner side of the door which can be coupled with the normal bolting and locking mechanism for the door. Triggering of the deflection limiter controlled by pressure difference is not provided according to this variant. In this case too, the lever is advantageously only subjected to tensile forces from a structural viewpoint. The arrangement of the holding element formed as a lever is preferably realised in the region of the door leaf edge, while the barbed hook serving as an abutment is fixed lying opposite in the region of the door leaf edge. Alternatively the position of the lever and abutment can be swapped.

Further advantageous embodiments of the invention are set out in the further claims.

DETAILED DESCRIPTION

Figure 1:
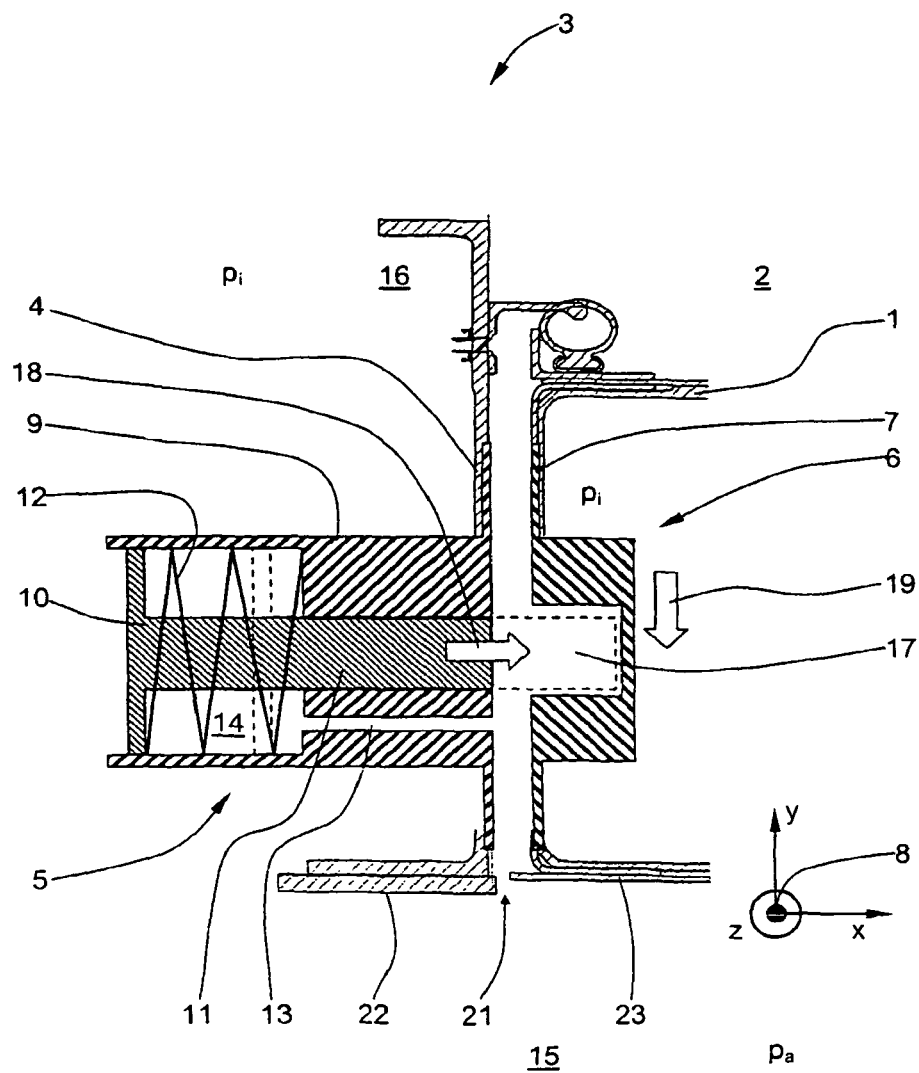
FIG. 1 a section through a first embodiment of the device in the rest state or in the standby state, FIG. 2 a section through the first embodiment of the device in the locked state (door secured against deflection), FIG. 3 a section through a second embodiment of the device in the rest state or in the standby state, FIG. 4 a section through the second embodiment in the locked state, FIG. 5 a sub-variant of the second embodiment with the position of the lever and abutment swapped, and FIG. 6 a third manually actuated embodiment in the operating or locked state.
Figure 2:
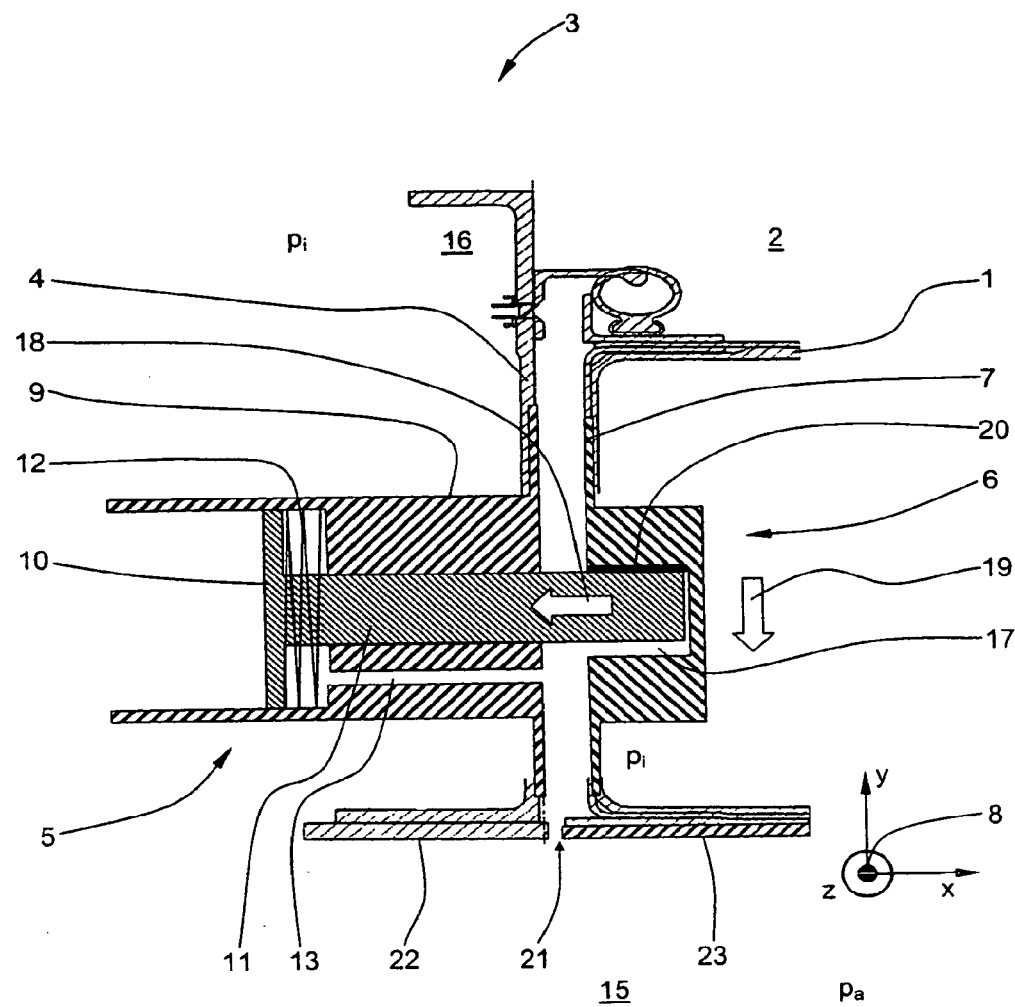

The same structural elements have the same reference numerals in the drawings. Reference is made below initially to FIGS. 1 and 2 simultaneously.

FIG. 1 shows a section through a first embodiment of the device in the so-called "rest state", in which there is no deflection limitation of the aircraft door or the freight door, while FIG. 2 shows the so-called "locked state", in which further deflection of the door is blocked.

A door 1 closes a recess 2 in a fuselage cell 3 of an aircraft in a virtually pressure-tight way. In the fuselage cell 3 there is an internal pressure $p_i$ while outside of the fuselage cell 3 there is an outside air pressure $p_a$ (ambient air pressure). In the region of a door jamb 4 there is a holding element 5 which cooperates with an abutment 6, or engages therein, for the purpose of deflection limitation of the door 1. The abutment 6 is positioned in the region of a door leaf edge 7 at the same height in relation to the holding element 5.

A coordinate system 8 illustrates the orientation of all components in space, whereby the x-axis points in the flight direction of the aircraft, the y-axis is orientated at right angles to the flight direction and the z-axis points upwards—relative to the surface of the earth.

During flight at a great height the door 1 is pressed outwards, that is to say in the opposite direction of the y-axis, and is thereby deformed as a result of the outside air pressure $p_a$ which is considerably lower than the internal pressure $p_i$. This deflection which is undesirable particularly for aerodynamic reasons is to be prevented by means of the device according to the invention.

In the case of the first embodiment the holding element 5 is formed as a cylinder 9, in which a piston 10 is received so that it can be displaced horizontally. The piston 10 is connected to a piston rod 11. Alternatively, the piston rod 11 can be an integral component of the piston 10. A spring 12 surrounding the piston rod 11 concentrically, particularly a helical or cylindrical spring, presses the piston 10 into the "rest state" of the device shown in FIG. 1.

In the "rest state" the door 1 can be operated and locked in the usual way. The cylinder 9 has a pressure compensation channel 13 with a smaller cross-section which creates a connection between a cylinder inner area 14 and an outer area 15 surrounding the fuselage cell 3 of the aircraft. In the region of the outer area 15 the outside air pressure $p_a$ prevails while there is a controlled internal air pressure $p_i$ in an inner area 16 within the fuselage cell 3 of the aircraft. During flight the internal air pressure $p_i$ is generally considerably higher than the outside air pressure $p_a$ ($p_i > p_a$) so that there is a pressure difference $\Delta p$ between the outer area 15 and the inner area 16 of the fuselage cell 3. If on the other hand the aircraft is on the ground there is generally a pressure compensation between the inner area 16 of the fuselage cell 3 and the outer area 15 surrounding the aircraft, so that there is a pressure difference $\Delta p$ of around 0 hPa ($p_a \approx p_i$).

The abutment 6 for the holding element 5 is arranged in the door jamb 4 in the form of a recess 17. The recess 17 comprises such a cross-sectional area or cross-sectional geometry that the piston rod 11 can be brought at least partially into a positive locking fit therein, as indicated by the dotted representation of the piston 10 and the piston rod 11. The piston rod 11 is preferably cylindrical while the recess 17 forming the abutment 6 is a bore, into which the cylindrical piston rod 11 can be brought with a small clearance.

During the flight the outside air pressure $p_a$ falls in relation to the internal air pressure $p_i$ ($p_i > p_a$) considerably so that as a result of the pressure difference $\Delta p$ a mechanical force 10 acts on the piston 10 and this is displaced together with the piston rod 11 against the force of the spring 12 in horizontal direction (parallel to the x-axis) to the right in the direction of the horizontal arrow 18. The piston rod 11 is hereby inserted at least partially into the recess 17. In this (standby) state of the device a slight deflection of the door 1 in the direction of the vertical arrow 19 is still possible as there is a slight mechanical clearance in radial direction between the piston rod 11 and the recess 17.

If the altitude of the aircraft increases further, however, the pressure difference $\Delta p$ between the internal pressure $p_i$ in the fuselage cell 3 and the outside air pressure $p_a$ is increased further ($p_i >> p_a$) and the door 1 deforms further. The door 1 can, however, only deform so far on account of the increasing pressure difference bop until the piston rod 11—as shown in FIG. 2—lies in the region of a contact surface 20 directly against the recess 17. In this final locked state any further deflection of the door "downwards" in the direction of the vertical white arrow 19 (against the direction of the y-axis) is blocked. An essentially aerodynamically "smooth" transition in the region of a crack 21 of a door between an outer shell 22 of the fuselage cell 3 and a door outer surface 23 is thereby achieved under all flight conditions.

By means of the spring 12 the level of the necessary pressure difference bop between the internal air pressure $p_i$ and the outside air pressure $p_a$ at which the deflection limitation is actuated can be adjusted. In addition the spring 12 ensures the pulling back of the piston rod 11 from the recess 17 if the pressure difference $\Delta p$ has again fallen below a certain minimum value. In a particularly preferred embodiment of the invention the spring force of the spring 12 can be continuously adjusted in order to be able to adapt the device (deflection limiter) to different aircraft types and/or flight conditions. In addition the spring 12 can be pre-stressed in the rest state.

Generally, the holding elements and abutments which are each formed corresponding to the holding element 5 and the abutment 6 are arranged in the regions of the door 1 in which according to experience the greatest deflections occur. A multitude of correspondingly designed holding elements and abutments can be provided.

Figure 3:
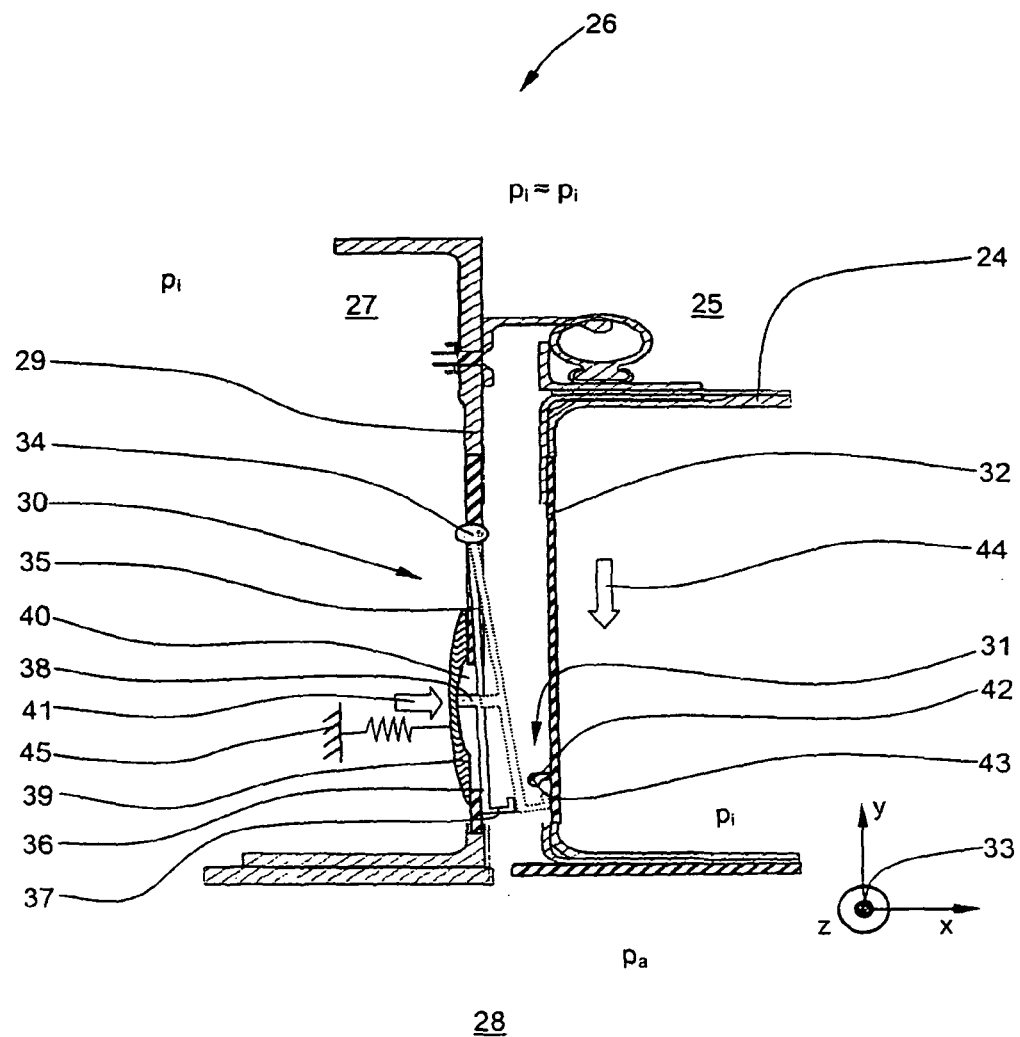
Figure 4:
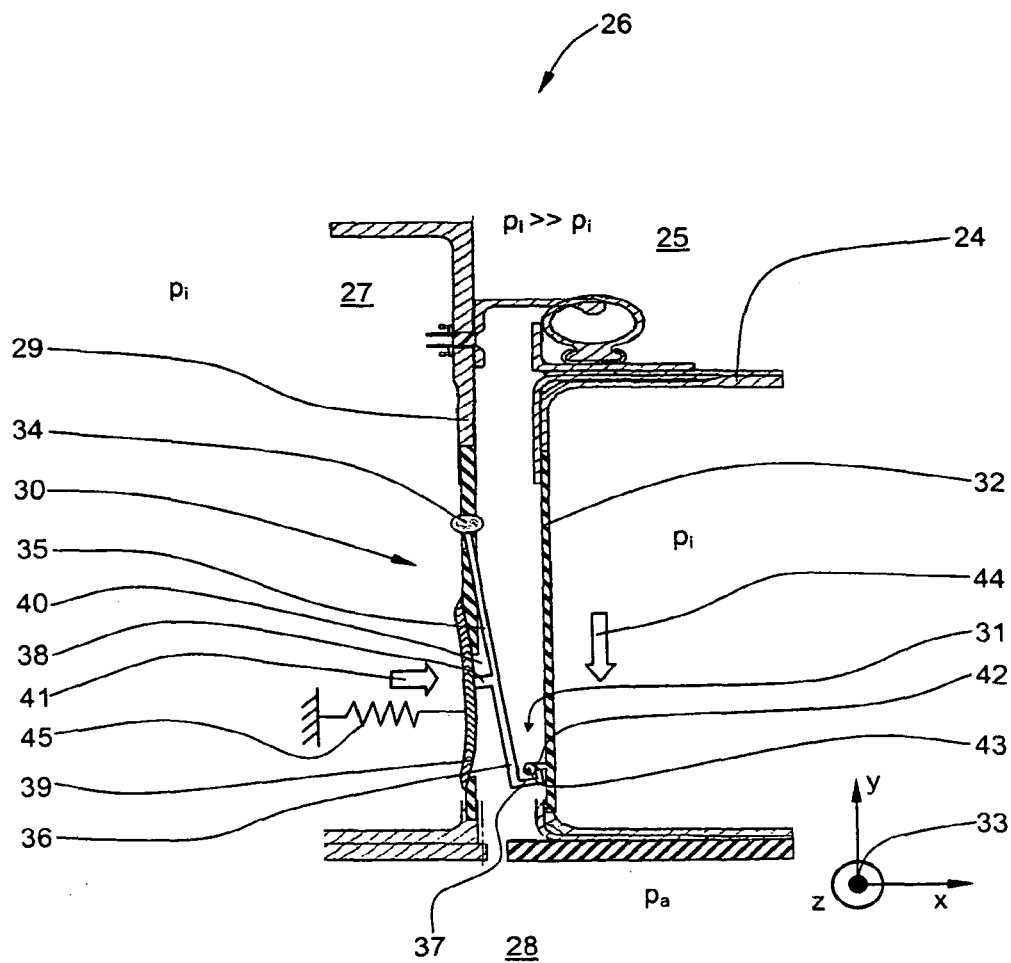

FIGS. 3 and 4 show a second embodiment of the device in the "rest state" or "standby state" and in the "locked state". A door 24 closes in turn a recess 25 serving as an abutment in a fuselage cell 26 of an aircraft (not shown) in an essentially pressure-tight way. Within an inner area 27 of the fuselage cell 26 there is an internal pressure $p_i$ while in an outer area 28 outside of the fuselage cell 26 the outside air pressure $p_a$ (ambient air pressure) prevails. In the region of a door jamb 29 a holding element 30 is arranged which cooperates with an abutment 31 for the purpose of deflection limitation of the door 24. The abutment 31 is positioned so as to be slightly offset in the region of a door leaf edge 32 in relation to the holding element 30. A coordinate system 33 shows in turn the orientation of all components in space. The orientation of the x-axis, the y-axis and the z-axis hereby corresponds to the orientation of the coordinate system 8 in FIGS. 1 and 2.

In the second embodiment the holding element 30 is formed as a lever 35 connected so as to be pivotable by means of a joint 34 in the region of the door jamb 29. For the operation of the deflection limitation a recess 40 with a small cross-section of a few square millimeters or square centimeters is sufficient, as the force available for actuation of the lever 35 depends solely upon the pressure difference $\Delta p$ acting on the membrane 39 ($F = p^* \text{surface}_{membrane}$). Accordingly the structure of the frame serving for incorporation in the region of the door jamb 29 and the integrity of the door leaf edge 32 are not noticeably impaired. A hook 37 is arranged at one end of the lever 36. An (actuation) pin 39 is arranged approximately on the middle of the lever 35. The actuation of the lever 35 is realised through an elastic membrane 39 which completely closes a recess 40 in the region of the door jamb 29 in a pressure-tight way. The elastic membrane 39 partially assumes the function of the spring 12 in the first embodiment. The elastic membrane 39 can be made for example from any elastomer such as rubber, a silicone elastomer or similar. Alternatively the membrane 39 can also be made with a thin metal plate. The lever 35 pivots from the position in FIG. 3 into the position shown in FIG. 4.

The elastic membrane 39 can also be formed as a bellows in order to increase the sensitivity to response. The elastic membrane 39 can be mechanically pre-stressed by means of a tensioning device which is not shown. In a particularly preferred embodiment the pre-stressing of the membrane 39 can be adjusted continuously in order to vary the response characteristic of the device and to adapt it to different aircraft types and/or flight conditions.

If the aircraft is close to the ground the internal pressure $p_i$ and the outside pressure $p_a$, are virtually equal and the lever 35 is in the position indicated with the continuous line ($p_i = p_a$). In this "rest state" of the device there is no deflection limitation and the door 24 can be operated and locked normally. After the start of the aircraft and at increasing altitude the surrounding outside air pressure $p_a$ becomes increasingly lower than the internal air pressure $p_i$ prevailing in the inner area 27 of the fuselage cell 26 ($p_i > p_a$). A force hereby acts in the direction of the white horizontal arrow 41 on the membrane 39 which presses on a pin 38 arranged on the lever 35 and pivots the lever 35 into the position shown with the dotted line. The abutment 31 is formed as a barbed hook 42 in the case of the second embodiment of the device which cooperates with the hook 37 of the lever 35 or engages behind it. The barbed hook 42 has for this purpose a small mushroom-like thickened area 43 arranged at an end which serves for fixing in position or for hooking behind the hook 37 in the "locked state" of the device.

If the internal pressure $p_i$ is greater than the outside air pressure Pa, as a result of the pressure difference $\Delta p$ between the inner area 27 in the fuselage cell 26 and the outer area 28 surrounding the aircraft, the membrane 39 is pressed in the direction of the arrow 41 and the lever 35 is pivoted so far until the hook 38 initially lies against the door leaf edge 32 ($p_i > p_a$). In this (standby) state a slight deflection of the door 24 in the direction of the vertical arrow 44 is still possible. If, however, the outside air pressure $p_a$ increases as a result of further increasing altitude of the aircraft in relation to the internal air pressure $p_i$ ($p_i \gg p_a$), the door 24 deflects further in the direction of the vertically downwardly orientated white arrow 44 (against the orientation of the y-axis) and the hook 37 lies fixedly behind the mushroom-like thickened area 43 of the barbed hook 42, whereby any further deflection of the door 24 is prevented. In this state of the device the final locked state is reached, in which a deflection limitation of the door 24 is realised.

In the illustration of FIGS. 3 and 4 an optional spring 45 is shown in order to support the pulling back of the lever 35, if there is a pressure difference $\Delta p = p_i - p_a$ of around 0 hPa, against the direction of the arrow 41. The spring 45 is essentially relaxed in FIG. 3 while the spring 45 in FIG. 4 is stressed.

Unlike the illustration of FIGS. 3 and 4, a plurality of membranes can be provided which act via a suitable mechanical arrangement on the lever 35 in order to increase the actuating forces.

In comparison with the first embodiment the second embodiment according to claim 5 has the advantage of a simplified structure, whereby at the same time the maintenance requirements are reduced on account of a smaller number of moving parts. In the case of the previously known deflection limiters a mechanical coupling between the door locking and the limiter is constantly necessary, whereby the weight and the construction requirements are increased. In contrast the deflection limitation according to the invention actuated through pressure difference has a simple structure and allows automatic actuation of the deflection limitation for the aircraft doors or the freight doors which is additionally decoupled from the normal locking mechanism of the doors.

In addition the second embodiment has the advantage that the force acting on the door 24 is essentially transmitted as tensile force via the lever 35 while in the previously known deflection limiters the force transmission element which is generally cylindrical (pin, bolt) is subjected to bending stress.

Figure 5:
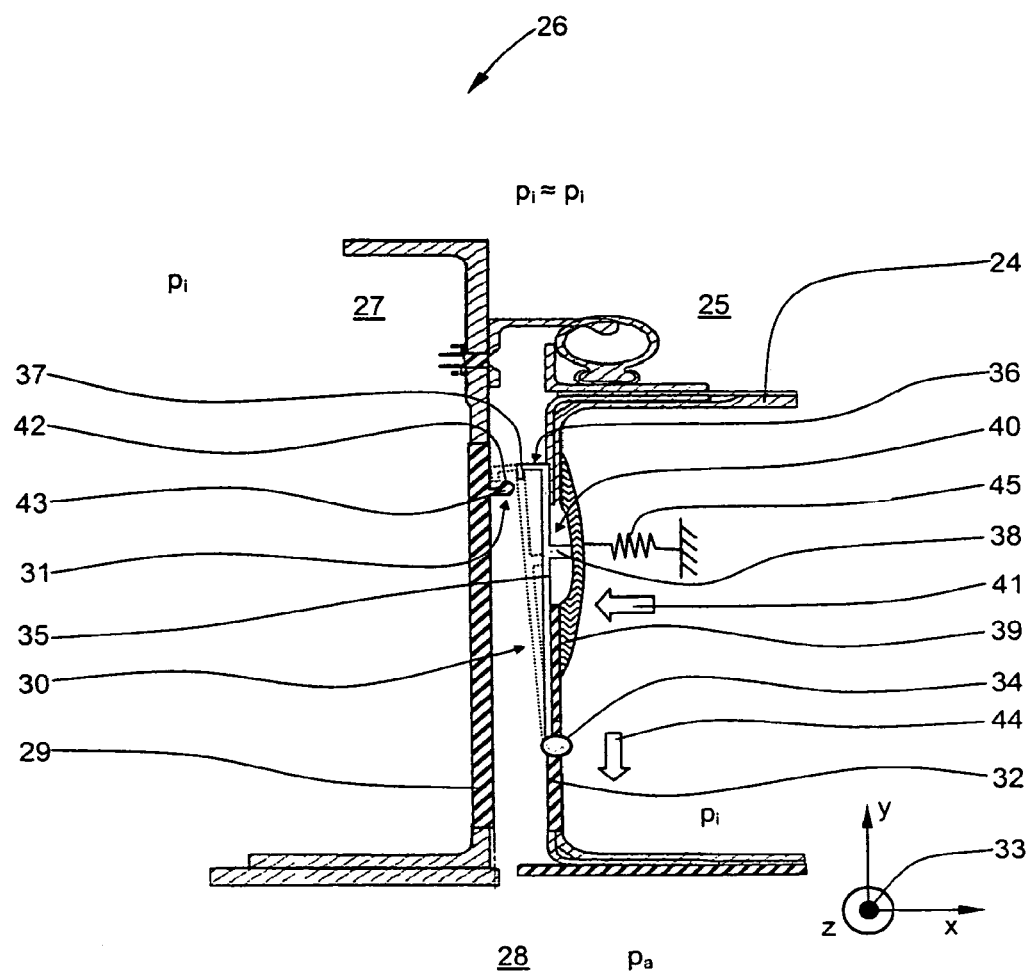

FIG. 5 shows a sub-variant of the second embodiment which is characterised by a swapping of the positions of the lever 35 and the abutment 31 or the barbed hook 42 on the door leaf edge 32 and the door jamb 29, whereby the operating principle is otherwise identical.

Unlike the embodiment according to FIGS. 3, 4, the abutment 31 is positioned so as to be stationary in the region of the door jamb 29 while the lever 35 and the membrane 39 are fixed in the region of the pivoting door leaf edge 32. The device in the illustration of FIG. 5 is in the standby state or rest state, that is to say the lever 35 is not in engagement with the barbed hook 42. The position of the lever 35 indicated in dotted lines shows on the other hand the position of the lever 35 in the "secured state", in which it cooperates with the barbed hook 42. The reference numerals of FIG. 5 correspond to those of FIGS. 3, 4 so that reference is made to the above explanations for further details.

Figure 6:
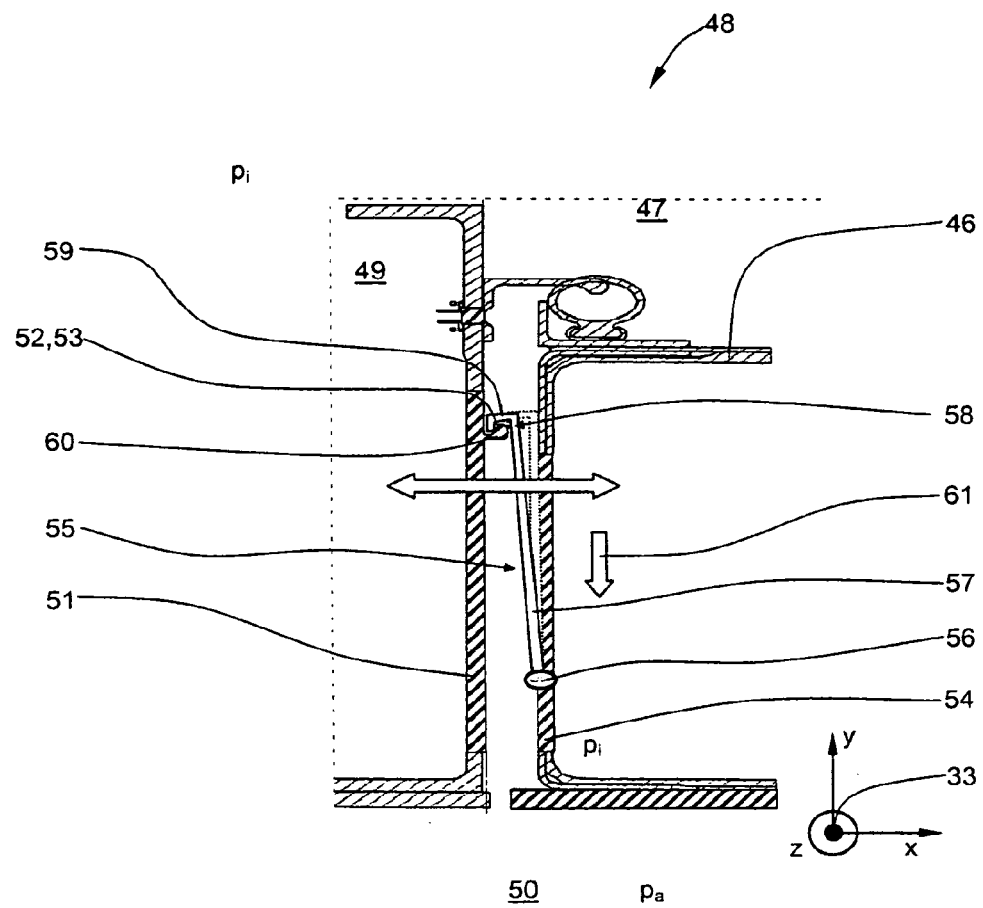

FIG. 6 shows a third embodiment of the deflection limiter according to the invention with manual actuation.

A door 46 closes in turn a recess 47 in a fuselage cell of an aircraft (not shown) in an essentially pressure-tight way. Between an inner area 49 in which the pressure $p_i$ prevails and an outer area 50 in which there is an outside pressure of Pa, there is a pressure difference $\Delta p$ in dependence upon the respective altitude of the aircraft. In the region of a door jamb 51 there is an abutment 52 in the form of a barbed hook 53. A holding element 55 is provided at approximately the same height in the region of a door leaf edge 54. The holding element 55 comprises essentially a lever 57 which is connected so as to be pivotable by means of a joint 56 in the region of the door jamb 51. At one lever end 58 there is an end hook 59, corresponding to the second embodiment, which can be brought into engagement with the barbed hook 53. For this purpose the barbed hook 53 in turn comprises an essentially mushroom-like thickened area 60. In the illustration of FIG. 5 the device is in the operating or locked state, that is to say the door 46 can no longer deform, on account of the pressure difference $\Delta p$, in the direction of the arrow 61, that is to say against the direction of the y-axis of the coordinate system 33. In order to be able to open the door 46 in an unhindered way, the lever 57 is manually pivoted by means of a mechanism not shown in greater detail in FIG. 5 into the position shown in dotted lines (so-called "rest state").

Unlike the first two embodiments the lever 57 is actuated solely manually in the third embodiment by the crew members using the mechanism not shown and preferably arranged in the inner region of the door 46, that is to say pivoted in the direction of the white double arrow running horizontally. This mechanism can be coupled with the always present actuating and locking mechanism of the door 46, so that upon unlocking the door 46 the deflection limitation is deactivated as standard and is activated again upon locking the door 46.

Also in this third embodiment the lever 57 is essentially only subjected to tensile force, which requires amongst other things lower actuating forces in comparison with a locking bolt or locking pin subjected to bending stress. An automatic, solely pressure-difference-controlled actuation of the deflection limitation for the door 46 is not provided.

The invention can be summarised as follows:

The object of the invention is a device for limiting the deflection of a door 1, 24, 26 arranged in a fuselage cell 3, 26, 48 of an aircraft, having at least one holding element 5, 30, 55 and at least one abutment 6, 31, 52. In a first embodiment the holding element 5 is formed as a spring loaded piston rod 11 which, in case of a sufficiently large pressure difference $\Delta p$ between an internal pressure $p_i$ in the fuselage cell 3 and an outside air pressure Pa, can be brought in a standby state into at least one preferably cylindrically formed recess 17 as an abutment 6 for the purpose of deflection limitation of the door 1 ($p_i > p_a$). In case of a very large pressure difference $\Delta p$ ($p_i \gg p_a$) any deflection movement of the door 1 in the then given locked state is completely blocked as there is an at least partial positive locking fit between the piston rod 11 and the recess 17. Close to the ground ($p_i \approx p_a$) in a rest state the door 1 can be operated and locked as usual. In a second embodiment the deflection limitation is realised by means of a membrane 39 which is subjected on one side to the pressure difference Δp. By means of the membrane 39 the lever 35 which has an end hook 37 can be brought into engagement with an abutment 31. In a third embodiment the actuation of the lever 57 is realised manually by means of a suitable mechanism which is trigged by hand by the crew and thus independently of the prevailing pressure difference Δp. Both levers 35, 57 are essentially only subjected to tensile forces. The device works either automatically through pressure difference control or can be controlled manually in the third embodiment. In case of an automatic pressure difference control the device is independent of the normal operating or locking mechanism of the door 1, 24.

REFERENCE NUMERALS

1 Door
2 Recess (fuselage cell)
3 Fuselage cell (aircraft)
4 Door jamb
5 Holding element
6 Abutment
7 Door leaf edge
8 Coordinate system
9 Cylinder
10 Piston
11 Piston rod
12 Spring
13 Pressure compensation channel
14 Cylinder inner area
15 Outer area
16 Inner area (fuselage cell)
17 Recess (abutment)
18 Arrow (horizontal)
19 Arrow (vertical)
20 Contact area
21 Crack of door
22 Outer shell (fuselage cell)
23 Door outer surface
24 Door
25 Recess (fuselage cell)
26 Fuselage cell (aircraft)
27 Inner area (fuselage cell)
28 Outer area
29 Door jamb
30 Holding element
31 Abutment
32 Door leaf edge
33 Coordinate system
34 Joint
35 Lever
36 Lever end
37 Hook
38 Pin
39 Membrane
40 Recess (door jamb/door leaf edge)
41 Arrow (horizontal)
42 Barbed hook
43 Thickened area
44 Arrow (vertical)
45 Spring
46 Door
47 Recess (fuselage cell)
48 Fuselage cell (aircraft)
49 Inner area (fuselage cell)
50 Outer area
51 Door jamb
52 Abutment
53 Barbed hook
54 Door leaf edge
55 Holding element
56 Joint
57 Lever
58 Lever end
59 Hook
60 Thickened area
61 Arrow

The invention claimed is:

1. A device for limiting deflection of a door having a pivoting door leaf edge and the door being arranged in a fuselage cell of an aircraft, the device comprising:
   at least one abutment; and
   at least one holding element;
   wherein the at least one holding element is pivotable automatically in case of a sufficiently large pressure difference between internal pressure in the fuselage cell and outside air pressure, whereby the at least one holding element is brought into engagement with the at least one abutment while the door is in a closed position; and
   wherein the at least one holding element comprises a lever coupled to an elastic membrane which has a hook and the at least one abutment comprises a barbed hook, and wherein the elastic membrane is subjected to a pressure difference between the internal pressure and the outside air pressure such that if there is the sufficiently large pressure difference the hook is brought into engagement with the barbed hook.

2. The device according to claim 1, wherein the elastic membrane is arranged in a region of a door jamb or in a region of the pivoting door leaf edge and completely covers a recess arranged therein.

3. The device according to claim 1, wherein the hook is connected so as to be pivotable by a joint disposed in a region of a door jamb or in a region of the pivoting door leaf edge, and the hook is arranged at an end of the lever pointing in a direction away from the end of the lever.

4. The device according to claim 1, wherein the lever is provided with a pin and the elastic membrane lies against the pin or is connected to the pin in a jointed way.

5. The device according to claim 1, wherein the barbed hook comprises a thickened area for holding the barbed hook.

6. The device according to claim 1, wherein the elastic membrane is coupled to a spring in such a way that the hook is configured to lift away from the barbed hook if the sufficiently large pressure difference is around 0 hPa.

7. The device according to claim 1, wherein the hook is connected so as to be pivotable by a joint in a region of a door jamb or in a region of the pivoting door leaf edge, and wherein the lever is pivotable automatically in such a way that the hook is brought into engagement with the barbed hook arranged in the region of the door jamb or in the region of the door leaf edge.

* * * * *